Patented Feb. 17, 1942

2,273,613

UNITED STATES PATENT OFFICE 2,273,613

PROCESS FOR PREPARING MIRRORS

Willard F. Bartoe, Hulmeville, Pa., assignor to Röhm & Haas Company, Philadelphia, Pa.

No Drawing. Application February 17, 1939, Serial No. 256,927

2 Claims. (Cl. 91—69.1)

This invention relates to the silvering of surfaces of objects made of $\alpha$-methacrylate resin. It concerns the formation of mirrors on sheets or other objects comprising transparent, solid, polymerized alkyl $\alpha$-methacrylate. It particularly deals with the steps which make possible the formation of bright, continuous silver films on these objects.

When the methods developed for silvering glass were applied to the formation of mirrors on objects made of polymerized methacrylate resin, bright, continuous, adhering deposits of silver could not be obtained. Mere adjustments in the formulae of the silvering solutions were not productive of results. Variations in accepted cleaning methods were not effective. It was discovered, however, that mirrors could be formed on objects of methacrylate resin if their surfaces were treated for a relatively long period of time with a strongly alkaline solution and if a proper procedure was then followed for depositing a colloidal film of silver on the surface of the polymerized methacrylate object. Such mirrors are desirable wherever there is danger of breaking glass mirrors. Mirrors on methacrylate polymers are also of value where light weight is of importance since the polymers are much less dense than glass. They are useful in dresser sets, for safety reflectors, decorations, cosmetic accessories, as mirrors for automobiles, for railway cars, for aircraft and for light water-craft, for highway mirrors, for mirrors in doors and instruments such as galvanometers, vibration recording instruments and the like, etc.

It is accordingly an object of this invention to provide a method whereby transparent objects made with $\alpha$-methacrylate resin may be silvered to form mirrors.

In carrying out the steps of my process, the article of methacrylate polymer which is to be silvered may be cleaned with a solution of a detergent. It is then treated for 12 to 48 hours at room temperature with a solution containing 300 to 500 parts of an alkali hydroxide to 1000 parts of water. The object is then rinsed with water and placed in the silvering tray where it is covered with the silvering solution. The tray is gently agitated, as by rocking, until the solution has become essentially colorless. The spent liquor is poured off, the object rinsed twice with water, which must be pure or distilled, and a second silvering solution applied. When this solution has deposited its silver, it is removed and the object rinsed once. It is then swabbed quite gently with clean cotton while water flows over the object. After a final rinse with distilled water, another silvering operation is performed, and this cycle may be repeated if it is so desired. Usually, however, three treatments give a good mirror when the concentrations of silvering solution, as given later, are used. If lower concentrations are used, more steps are required, and if higher concentrations are used, fewer steps are necessary. After the final rinsing, the object is dried at not over 35° C. for several days. The silvered surface may then be given a coating of a suitable paint to protect the mirror. When the paint is dry, the front surfaces of the object may be cleaned. If silver has been deposited thereon, the front surfaces are cleaned with a solution containing equal volumes of chemically pure nitric acid and water and then rinsed. For the final cleaning a solution of a free rinsing synthetic detergent, such as a sulfonated ether or sulfated alcohol, is swabbed on and rinsed off first with tap water and then with distilled water. The object is then dried by permitting the water to evaporate.

The solutions which are required for the successful preparation of mirrors on methacrylate polymer comprise the solution of alkali, a silver solution, a reducing solution, a nitric acid solution as already described, and a detergent solution. For preparation of the surface a strong solution of sodium or potassium hydroxide is necessary. The preferred concentration is 350 parts of a chemically pure grade in 1000 parts of distilled water. This solution must be made and kept in containers which do not contaminate the hydroxide solution. Contamination by iron or iron salts must be avoided. The solution may be used and kept as long as it is not turbid. The tank used for treating the methacrylate polymer should be of material which will withstand strongly alkaline solutions, such as ceramic ware, glass, nickel or nickel coated material. The tank should be of sufficient size to permit immersion of the object to be cleaned and to allow swabbing of the object to remove air bubbles. The object of methacrylate polymer is kept submerged by any suitable device or weight. With the preferred concentration of alkaline hydroxide a period of immersion of 12-24 hours gives satisfactory results. Longer times of soaking may be used, but with an excessive time of treating, there is danger of absorption of water by the polymer. Within the range of about 300 to 500 grams of sodium hydroxide per liter of water, longer times than 48 hours are unnecessary. Lower concentrations are effective in preparing the surface but require longer times of treatment with consequent danger of water absorption. The best temperature for treatment is about room temperature. Warmer solutions may, however, be used. They act more rapidly, but cause greater absorption of water by the polymer, a condition which is undesirable.

During this treatment with strong alkali some change takes place in the surface of the polymerized material. It is not known whether the change is purely physical or chemical, or both. There may be a surface reaction whereby a metallic ion is taken up by the polymer, or there may be a surface hydration. In any case the hydroxide treatment makes possible the production of silver mirrors which up to the time of the present invention had not been produced.

The silvering solution is made from three separate solutions, the preferred compositions of which are (1) 100 parts of purest silver nitrate in 1000 parts of distilled water; (2) 100 parts of reagent quality sodium hydroxide in 1000 parts of distilled water; and (3) 400 parts (by volume) of C. P. 28% ammonium hydroxide in 600 parts (by volume) of distilled water. The preferred silvering solution is prepared by first mixing 50 parts of the sodium hydroxide solution with 40 parts of the ammonia solution and adding this to 1250 parts of distilled water. To this dilute alkaline solution approximately 150 parts of the silver nitrate solution is added slowly with stirring. The correct amount has been added when a clear solution is obtained with only a small amount of light brown precipitate. If a permanent black precipitate results, the solution is not of value and should be discarded. If a permanent light brown precipitate is formed before 150 parts of the silver solution has been added, it is advisable to add 1 to 2 parts of Solution #3 and proceed with the addition of the silver solution until a light brown precipitate results. This particular final solution should not require more than 170 parts of Solution #1.

The silvering solution is prepared freshly and should not be kept from day to day. Enough may be prepared at a time for three or more successive silvering treatments which are used to give a sufficiently thick and complete mirror. The composition of the silvering solutions used in my process are somewhat stronger in silver than the solutions used for silvering glass by the Brashear process, while the amount of alkali is about the same. In silvering methacrylate polymer the silver solutions may contain 10 grams to 30 grams of silver nitrate per liter, 3.3 grams to 5 grams of sodium hydroxide per liter, and sufficient ammonia to react with the silver ions. I prefer to use the lower concentrations shown for reasons of economy and because greater uniformity and freedom from pin holes result in the final deposit. Still lower silver concentrations are operative but uneconomical, since more silvering steps then become necessary.

In order to form a mirror a reducing solution is necessary. Satisfactory solutions are prepared from sugars, a typical formula being:

Cane sugar_____grams__ 90
Nitric acid, C. P_____milliliters__ 4
Ethyl alcohol_____milliliters__ 175
Distilled water to make 1000 milliliters.

The sugar is dissolved in about 500 ml. of distilled water and the nitric acid stirred in. Alcohol is added and then distilled water to make one liter. The solution is stored for at least a week before use.

When an object of methacrylate polymer has been made ready for silvering, by cleaning, if necessary, and treating the surface with the hydroxide solution, about 20 parts of the silvering solution (silver-hydroxide-ammonia) and 1 part of the ripened reducing solution are mixed and poured over the object to be silvered. The proportions of the silvering solution and the reducing solution will, of course, vary with the concentration of the silvering solution. For the lower silver concentrations 60 ml. of the reducing solution may be mixed with 1000 ml. of the dilute silvering solution; for the higher concentrations 120 ml. of the reducing solution may be mixed with 1000 ml. of silvering solution. These mixtures are prepared freshly and immediately before each silvering operation. They are used at room temperature.

In carrying out the procedure care should be taken to keep all apparatus and containers clean. The articles of polymeric methacrylate must be clean and should be handled as little as possible and then with clean rubber gloves. Sheets should be handled by the edges. The surface to be covered with a mirror should be kept wet from the time the silvering process starts until it is completed. Work should be done under as nearly dust-free conditions as possible. Sheets or other objects of methacrylate polymer should be protected by clean tissue paper. These and other precautions aid greatly in producing bright, continuous, adherent mirrors.

Although it is not essential, it is advisable to protect the silver film by a suitable coating. Paints and coatings of other metals have been used for protection of mirrors. Any paint used must be a non-solvent for methacrylate polymer. It is preferably pigmented with aluminum powder or a light gray pigment. Application by spraying avoids scratching, but paint may also be flowed on with a high grade, soft hair brush. After the paint has dried, the object with its mirror is protected by a wrapping of tissue paper until ready for use.

The polymerized methacrylate resins which may be used for the herein disclosed process are solid materials which result from the polymerization of methyl α-methacrylate, ethyl α-methacrylate, propyl α-methacrylate, ter-butyl α-methacrylate, individually or in mixtures thereof. The so-called methacrylate resins also include joint polymers consisting primarily or substantially of a methacrylate with an acrylate, such as ethyl acrylate, or with other compatible resins such as styrene. The solids may be prepared by casting or molding.

While I have set forth in this specification my preferred procedure which, after the preparation of the surface with strong alkali, follows the Brashear method of silvering, other processes of forming mirrors also may be used after the methacrylate resin has been prepared. It is to be understood that the invention is not limited to the exact sequence of steps which I have shown for my preferred process as variations in the silvering process will be apparent to those skilled in the art. I desire to protect this invention in whatever form the article may be made and within the scope of the appended claims.

I claim:

1. A process for forming a mirror on an article made of α-methacrylate resin which comprises treating the surface of said article for a period of time of the order of from 12 to 48 hours with a concentrated solution of an alkali hydroxide until the surface is receptive to silver, subjecting the surface to the action of a mixture of a silvering solution and a reducing solution, draining the spent solution and repeating the silvering operation until a continuous film of proper thickness has been deposited.

2. A process for forming a mirror on an article made of polymerized methyl-α-methacrylate which comprises treating the surface of said article for a period of time of the order of from 12 to 48 hours with a concentrated solution of sodium hydroxide until the surface is receptive to silver, subjecting the surface to the action of a mixture of a silvering solution and a reducing solution, draining the spent solution and repeating the silvering operation until a continuous film of proper thickness has been deposited.

WILLARD F. BARTOE.